United States Patent [19]
Colas et al.

[11] Patent Number: 5,205,240
[45] Date of Patent: Apr. 27, 1993

[54] METHOD AND SYSTEM FOR PREPARATION OF FEED RATIONS FOR ANIMALS

[75] Inventors: Pierre Colas, Lannedern; Michel Guillou, La Roche Maurice; Yvon Coroller, Ruffec, all of France

[73] Assignee: Volac Limited, Hertfordshire, England

[21] Appl. No.: 768,311
[22] PCT Filed: Feb. 8, 1991
[86] PCT No.: PCT/FR91/00096
  § 371 Date: Oct. 3, 1991
  § 102(e) Date: Oct. 3, 1991
[87] PCT Pub. No.: WO91/11908
  PCT Pub. Date: Aug. 22, 1991

[30] Foreign Application Priority Data
  Feb. 8, 1990 [FR] France ............... 90 01636

[51] Int. Cl.$^5$ .............................. A01K 5/00
[52] U.S. Cl. ................. 119/57.4; 119/51.12; 119/72
[58] Field of Search ............. 119/57.4, 51.12, 71, 119/72, 51.13, 52.4, 57.2, 57.3

[56] References Cited

U.S. PATENT DOCUMENTS

| | | | |
|---|---|---|---|
| 3,112,731 | 12/1963 | Lako et al. | 119/51.12 |
| 3,359,947 | 12/1967 | Biehl | 119/51.12 |
| 3,524,432 | 8/1970 | Tartar | 119/71 |
| 3,625,183 | 12/1971 | Tartar | 119/57.2 |
| 4,498,424 | 2/1985 | Leuschner | 119/57.2 |
| 4,513,687 | 4/1985 | De Jong | 119/27 |
| 4,541,361 | 9/1985 | Hölter | 119/57.4 |

FOREIGN PATENT DOCUMENTS

| | | | |
|---|---|---|---|
| 856089 | 10/1977 | Belgium. | |
| 3144477 | 11/1982 | Fed. Rep. of Germany | 119/52.4 |
| 1298222 | 11/1972 | United Kingdom | 119/72 |

Primary Examiner—John J. Wilson
Assistant Examiner—Todd E. Manahan
Attorney, Agent, or Firm—Locke Reynolds

[57] ABSTRACT

A method for the preparation and distribution of feed for animals, especially suitable for feeding piglets, includes a first step of preparing in a mixer a predetermined volume of a feed mixture of dry feed and diluting liquid. In a second step the feed mixture is distributed to the trough of each of the stalls, a volume of the mixture prepared in first step which varies according to the final volume of feed to be prepared for each trough. The third step requires diluting in each trough the feed mixture distributed in second step with a dilution liquid in order to obtain in each trough the final volume of feed with a predetermined concentration for each trough. The dilution of the third step is done by distributing the dilution liquid through the same conduits as that by which the mixture prepared in first step has been distributed to ensure cleaning of these conduits.

4 Claims, 2 Drawing Sheets

METHOD AND SYSTEM FOR PREPARATION OF FEED RATIONS FOR ANIMALS

This invention relates to a method for the preparation and distribution of feed for animals, especially piglets. The invention also relates to an installation for the implementation of this method.

In pig-rearing, a sow often farrows a greater number of piglets than its physiology permits it to suckle. Under these conditions, the healthy and vigorous piglets are well fed while the weaker and sicklier animals are ultimately doomed. For the pig farmer, this situation entails a possibly substantial loss.

DESCRIPTION OF THE PRIOR ART

To overcome this drawback, it has been proposed to feed some piglets of the farrow with substitute products such as powdered milk mixed with water.

However, implementing a method of regular feeding of substitute products can be difficult for a pig farmer. For example, the feedings should be regular and frequent, being required at least once an hour during the first days after birth of the piglets. In addition, each feeding should comprise a volume and dry feed concentration that varies according to the physiological age of the piglets and the period of time during which the piglets are fed. These requirements make for a fairly cumbersome system of feed management and back-up checks on the feed management.

Of course, automatic feed-distribution machines are known. However, when applied to the distribution of feed for piglets, known automatic feed-distribution machines are unable to resolve a number of technical problems related, first, to the dry feed concentration of the substitute feed (which is relatively low) and, second, to the fact that these substitute products may after distribution stagnate in the piping system of the machine, endangering the health of the piglets.

SUMMARY OF THE INVENTION

An aim of the invention, therefore, is to propose a method and an installation for automatically feeding piglets or other animals that can supply a desired dry feed concentration to each piglet and to prevent stagnation of substitute feed product in piping of the automatic machine.

To this end, the invention relates to a method for the preparation and distribution of feed for animals penned in a plurality of stalls. Each stall contains a trough for accepting feed, said feed being formed by at least one dry feedstuff mixed into a diluting liquid and being distributed in a predetermined volume and concentration to the trough of each of the stalls.

According to one aspect of the invention, the method comprises:

(a) firstly preparing, in a mixer, a predetermined volume of a mixture of dry feed and diluting liquid with a predetermined concentration of dry feedstuff;

(b) then distributing, by one and the same conduit, to the trough of each of the stalls, a volume of the mixture having only one concentration obtained in the step (a), this concentration of mixture being a function of a final volume of feed to be prepared for each trough, and (c) finally diluting, in each trough, the mixture distributed in (b) with the dilution liquid so as to obtain, in each trough, the final volume of feed with a predetermined concentration for each trough, the dilution made in (c) being done by distributing the dilution liquid through the same conduit as that by which the mixture prepared in (a) has been distributed in (b).

According to another characteristic of the invention, the final volume of feed prepared for each trough at the step (c) is a function of the physiological age of the animals to be fed and their number in each stall containing the trough, with the dry feed concentration of the final volume of feed prepared in (c) being a function of the period of time for which said animals have been fed in the stalls.

The invention also relates to an installation for the implementation of the above method. According to one characteristic, it comprises a set of stalls in which the animals are penned and in each of which there are installed, firstly a trough and, secondly, a means to controllably prevent the animals penned in the stall from reaching the trough, a distribution system comprising a hopper in which a dry feed is stored, a mixer that is provided with a stirrer and has two inlets and one outlet, one inlet being designed to receive the dry feed that is stored in the hopper and is brought by a conveyor and the other inlet being designed to receive the dilution liquid through a supply control means, the inlet of a pump being connected to the outlet of the mixer and the outlet of said pump being connected to a single conduit which uses distribution control means to supply the trough of each of the stalls, and a programmable automaton controlling the conveyor, the stirrer, the means used to control the distribution to each trough and the means used to prevent the animals from reaching the troughs.

BRIEF DESCRIPTION OF THE DRAWINGS

The characteristics of the invention referred to here above, as well as other characteristics, shall appear from the following description of an exemplary embodiment, said description being made with reference to the appended drawings, of which.

DETAILED DESCRIPTION OF THE INVENTION

Figure 1:
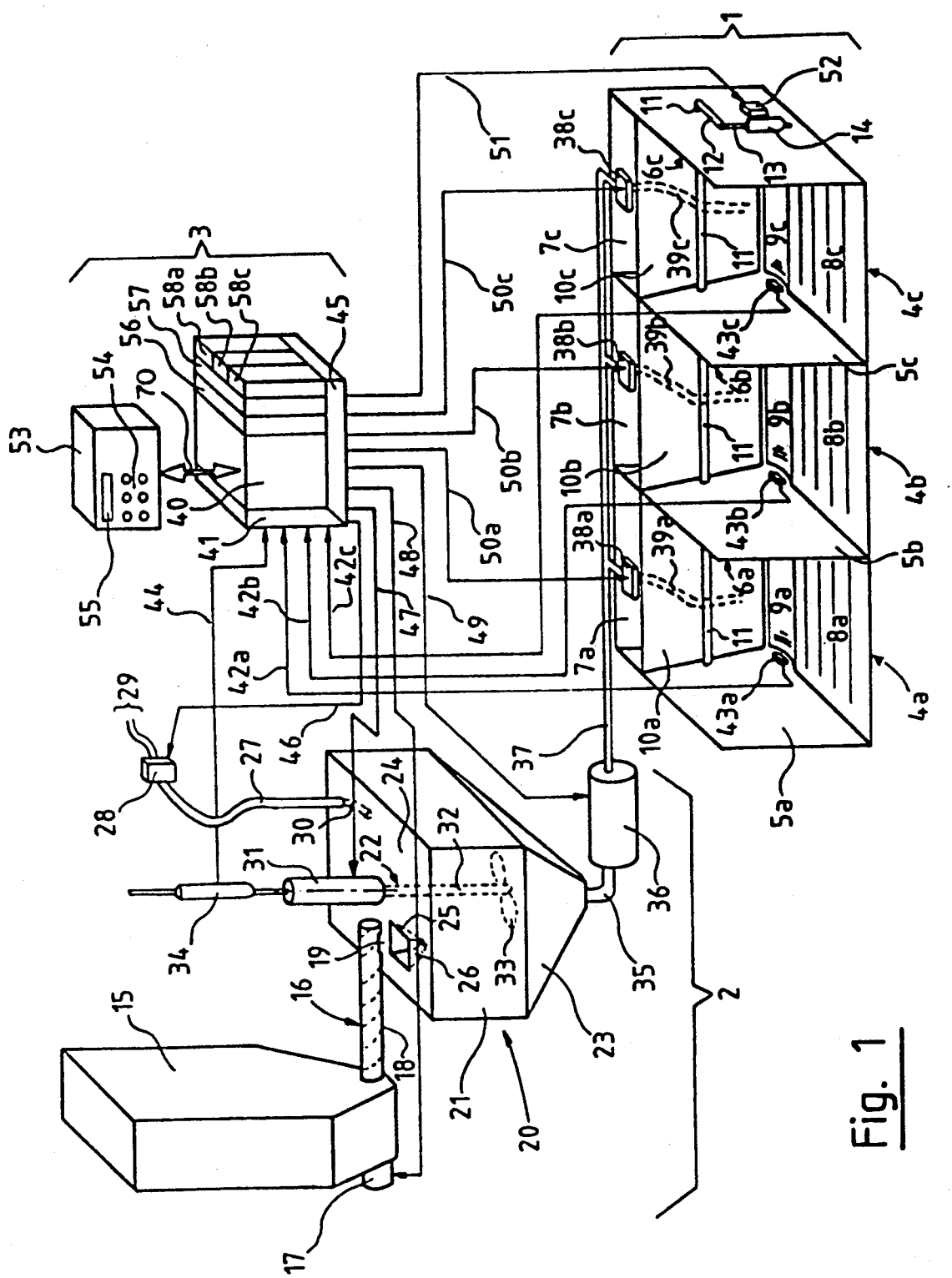
FIG. 1 shows a view in perspective of an animal-rearing installation according to the invention.

The feed distribution installation shown in FIG. 1 comprises a set of stalls 1, a distribution system 2 and a programmable automaton 3. In FIG. 1, the set of stalls 1 includes three stalls 4a, 4b, 4c. In practice, this number three is not restrictive and actually depends on the number of animals, in particular the number of piglets, that are to be fed in the installation. The stalls 4a, 4b and 4c are mounted side by side. Each stall has two side walls 5 and 6 (respectively 5a, 6a; 5b, 6b; 5c, 6c), a back wall 7, a grating 8 and, on the ground, along the back wall, a trough 9. Each stall further has a substantially vertical rectangular gate 10 fixed to a longitudinal and horizontal hinge 11. At the end of this hinge, there is fixed a connection rod 12 on which there is mounted, in a pivoting position, the rod 13 of a jack 14, the body of which is fixed, also in a pivoting position, to a lateral wall 6c of the end stall (4c in FIG. 1).

Figure 2:
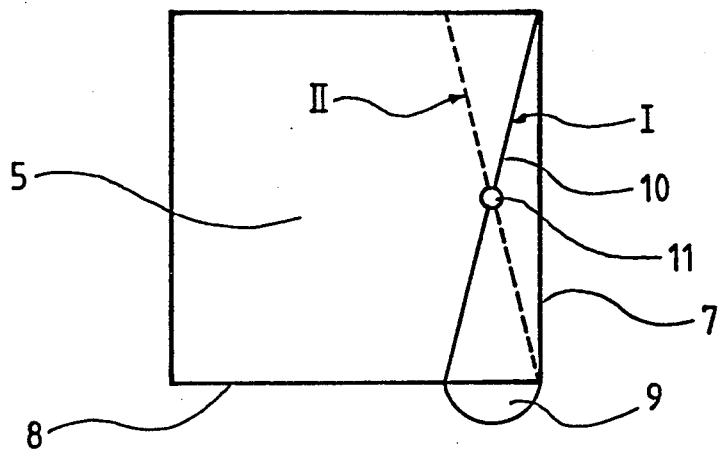
FIGS. 2 and 3 show two alternative embodiments of the retractable trough according to the invention.

Under the effect of the jack 14, the hinge 11 can rotate a certain angle to draw the gates 10a, 10b and 10c along with it. These gates may the assume two positions (FIG. 2). In a first position each of these gates, together with the lateral walls 5, 6 and the grating 8 of the stall, forms a volume from which the trough 9 is excluded. In the second position, each of the gates forms a volume in which there is the trough 9 of the stall.

The feed distributor 2 has a hopper 15 in which there is stored a dry feed such as powdered milk. The hopper 15 is provided at its base with a worm screw 16. This worm screw 16 is driven by an electric motor 17 and is enclosed in a tube 18 having an aperture 19 at one end. The feed distributor 2 also has a mixer 20 formed by a vessel 21 and a stirrer 22. The vessel 21 can have, for example, a substantially parallelepiped shape, with ends at its base defining a feeder cone 23. The vessel 21 is closed on its upper face by a horizontal plate 24. The horizontal plate 24 defines an aperture 25 from which a feeder cone 26 goes into the vessel 21. The end 30 of a flexible tube 27 is fixed to the plate 24. At its other end, the flexible tube 27 is connected by a supply control mechanism, such as an electrovalve 8, to a supply (not shown) of liquid (such as water) for diluting the dry feed. The tube end 30 is attached on the side of vessel 21 side, entering the vessel 21 and curving to lead into one of the side walls of the vessel 21. The stirrer 22 is fixed to the center of the plate 24. The stirrer 22 includes an electrical motor 31 having an elongated vertical shaft 32, at the end of which there is mounted a stirrer blade device 33. In the vessel 21, the stirrer blade 33 is slightly above the level of the feeder cone 23. The assembly formed by the vessel 21 and the stirrer 22 is suspended by means of a weighing device 34. This weighing device may include, for example, a type of strain gauge. The hopper 15 and the mixer 20 are positioned with respect to each other in such a way that the aperture 19 of the worm screw 16 is vertical to the aperture 25 of the plate 24.

The inlet of a pump 36 is connected to the outlet of the feeder cone 23 by a flexible tube 35. The outlet of this pump 36 is connected to a conduit 37. Lead-ins of electrovalves 38a, 38b, 38c are mounted, in a bypass connection, on the conduit 27. These lead-ins of electrovalves 38a, 38b, 38c are respectively connected to tubes 39a, 39b, 39c. The end of each of the tubes 39 slightly overhangs the trough 9 of the associated stall 4.

The mixer 20 is connected to the electrovalve 28 and to the pump 36 respectively by means of flexible tubes 27 and 35. This allows mixer 20 to be suspended only by the weighing device 34.

The programmable automaton 3 is constituted by a computer 40 provided with a set of input ports 41. These ports 41 are respectively connected, by wires 42a, 42b and 42c, to liquid sensors 43a, 43b and 43c, each of which is mounted in a trough 9 of an associated stall 4 and, by a wire 44, to the signal output of the weighing device 34. The computer 40 is also provided with a set of output ports 45 respectively connected, by the wire 46, to the control input of the electrovalve 28, by the wire 47 to the control input of the motor 17 of the worm screw 16, by the wire 48 to the control input of the motor 38 of the stirrer 22, by the wire 49 to the control input of the pump 36, by the wires 50a, 50b, 50c to the control inputs of the electrovalves 38a, 38b and 38c and, by the wire 51, to the input of an interface 52 for the control of a jack 14. The computer 40 is connected through a bus 70 to a man/machine communications interface 53, such as a keyboard 54 and a display device 55. The computer 40 is also functionally linked with a clock 56, a counter 57 and registers 58a, 58b and 58c, the number of these registers being equal to the number of stalls 4 of the installation. The functions of these elements (56, 57, 58) shall be explained here below.

The automated preparation and distribution of a feed to each stall 4 of the installation of the invention requires a first step in which the automaton 3 is initialized. Initialization is accomplished when piglets are introduced into the stalls 4. Piglets are generally introduced into the stalls after weaning, and are maintained in the stalls for a period of some weeks. For this initialization, the number of piglets introduced into each of the stalls 4 and their physiological age (which corresponds to their chronological age) are input to the automaton 3 through the man/machine interface 53. Each of the stalls 4 has only piglets of the same physiological age. The counter 57 and the registers 58a, 58b, 58c are initialized with the value zero. The counter counts the number of days for which the piglet are present in the stalls 4 of the installation. For each stall 4 (respectively 4a, 4b, 4c) of the installation, the registers 58 (58a, 58b, 58c) store the quantity of feed given to the trough 9 (9a, 9b, 9c respectively). The activation times of the clock 56 are then programmed through the man/machine interface 53.

Once these initialization operations have been performed, the automaton 3 stands by for an activation signal from its clock 56. Once activated, the automaton 3 takes account of the signals that it receives on all the input ports and that have come from the trough sensors 43a, 43b, 43c. If these signals indicate by their value that the troughs 9a, 9b, 9c are empty, the automaton then computes for each stall 4 the feed ration in volume and in dry feed concentration to be prepared and distributed. For each stall 4, this computation is done on the basis of two essential parameters:

first, the physiological age of the piglets allows determination of the final volume of feed to be prepared for each piglet. The final volume of feed per trough is then computed by multiplying this first volume by the number of piglets in the case considered, and second, the number of days for which the piglets have been present in their stall, this number being stored in the counter 57 to allow determination of the dry feed concentration of the final volume of feed to be prepared for each piglet and also for each stall. This computation is also done as a function of the quantity of feed already distributed during this period, this quantity being stored, for each stall 4, in the corresponding registers 58.

If, in one stall the sensor 43 indicates by the value of its output signal which its sends to the automaton 3, that the trough 9 is not empty, the automaton 3 informs the animal farmer of this fact, for example through an alarm (not shown), and the farmer takes any necessary steps. In this case, the automaton 3 stops distributing feed to this stall until the farmer orders it again, through the interface 53, to distribute feed.

Once the preliminary stage of the computation has been done, the preparation and distribution proper can begin. The automaton activates the opening of the electrovalve 28 and the dilution liquid (hot water for example) is introduced into the mixer 20. In the meantime, the weighing device 34 gives the automaton 3 signals through the line 44. The value of these signals, which increases proportionally to the mass of liquid introduced into the mixer, enables this mass to be deduced therefrom with precision. When this value reaches a threshold that has been computed beforehand by the automaton 3 during the preliminary computing stage, this automaton 3 closes the electrovalve 28. The volume of dilution liquid introduced depends on the final volume of feed to be prepared for each trough which, it may be recalled, depends on the age of the animals to be fed and their number in each stall. Through the weighing system described, the mass of dilution liquid introduced into the mixer 20 is determined with high precision, to within about the nearest gram.

Once the water has been introduced, the automaton orders the starting up of the motor 17 of the screw 16 and that of the stirrer 22. The screw 16 then carries along a certain quantity of dry feed from the hopper 15 to the aperture 19. This dry feed falls into the feeder cone 26 and the vessel 20. The stirrer 22 stirs the liquid/dry feed mixture so as to make it homogeneous. The weighing device 34 has its output signal, given to the automaton 3, which increases in value by a quantity proportional to the weight of dry feed introduced. When this signal goes beyond a second threshold, also computed by the automaton 3 during the preliminary computation stage, the automaton 3 interrupts the working of the screw 16. After a predetermined period of time, at the end of which the mixture is deemed to be homogeneous, the automaton 3 interrupts the working of the stirrer 22.

At this instant, the mixture prepared in the tank 20 has a given concentration, determined by the automaton 3 but independent of the age of the piglets and of the number of days for which they have been present in the installation. This concentration is, in fact, only greater than the highest concentration of the dry feed concentrations of feed to be prepared and distributed to each of the stalls 4.

The automaton 3 sends a command to the interface 52 which activates the jack 14 to operate the gates 10 and make them take a second position II in which the volume contained in the stalls 4 no longer communicates with the troughs 8. Thus, the piglets no longer have access to the troughs 4.

Just after the operation of the gates 10, the automaton 3 commands the operation of the pump 36 and the opening, in sequence, of the electrovalves 38a, 38b and 38c. The opening time of each electrovalve 38 is determined by the automaton 3 to distribute only one volume, for each trough, of a first mixture having only one concentration for all the troughs 9.

Once this volume has been distributed, the automaton 3 commands the electrovalve 28 which opens and enables the introduction of water into the mixer 20. If necessary, the stirrer 22 is started up, thus enabling the liquid in the vessel 20 to clean out the dry feed particles deposited during the previous stages on the walls of the vessel 20. The dry feed concentration of the liquid contained in the vessel 20 is very low.

Once the necessary quantity of water has been introduced, the automaton 3 orders the opening of a first electrovalve, for example 38a, and the starting up of the pump 36 for a precise period of time needed for the quantity of liquid poured into the trough 9a of the stall 4a to be such as to enable the obtaining of a volume of feed corresponding to the volume computed during the preliminary computing phase, and the obtaining of a dry feed concentration corresponding to that computed during this preliminary computation stage. With the liquid in the trough 9a being distributed, the automaton 3 resumes this liquid-adding operation for each of the other remaining troughs 9.

Once this set of consecutive operations has been carried out, the automaton 3 cumulatively stores the values of the quantities of dry feed and liquid consumed for the preparation of the ration of each trough 9 in the corresponding registers 58.

The automaton then commands the interface 52, and the jack 14 operates the gates 10 so that they return to their first position where the troughs 9 communicate with the rest of the volume of the stalls 4. After these operations, the automaton 3 stands by for an activation signal from its clock 56. When the clock 57 goes beyond a 24-hour count, it is reset at zero and the day counter 58 is incremented by one unit.

The advantages provided by the invention firstly lie during the distribution of the liquid to adjust the volume and concentration of feed in the troughs 9, with the mixer 20, the pump 36, the conduit 37, the pipes 39 and the electrovalves 38 being rid of the dry feed particles that might have been deposited therein during the distribution of the feed with only one concentration. A second advantage lies in the fact that the quantity of dry feed necessary in each trough 9 is relatively small, and that it is difficult to directly prepare a volume comprising such a low quantity of feed with the requisite precision. With the invention, on the contrary, the prepared quantity of liquid/dry feed mixture is substantially that of one trough multiplied by the number of troughs and therefore comprises a large quantity of dry feed which can be measured with high precision. Once the single mixture has been prepared and distributed, it is diluted with water in order to adjust the volume and concentration for each stall.

Figure 3:
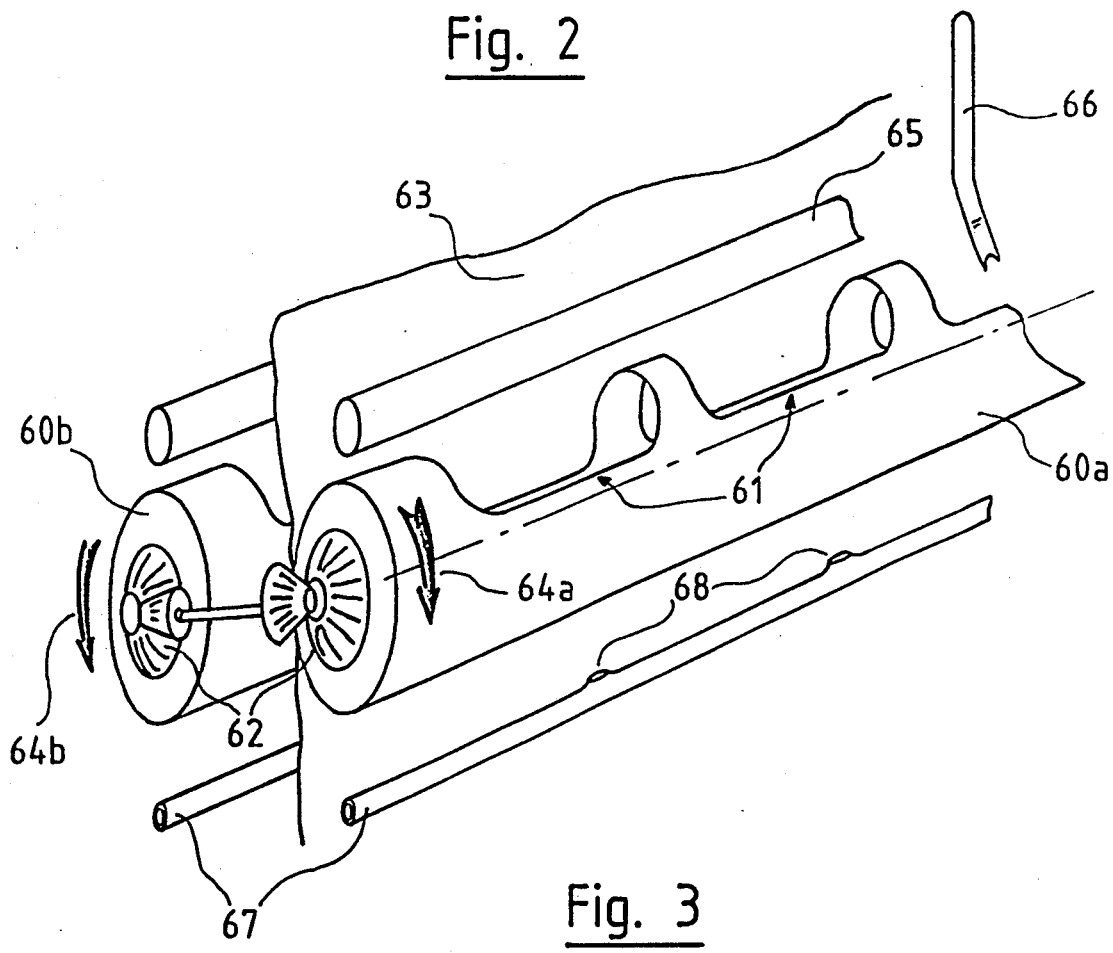

FIG. 3 shows an alternative embodiment of the troughs. In this embodiment, the troughs 60 are formed as tubes with a cylindrical section, made for example from PVC. Openings 61 are made so as to be juxtaposed along the tube 60. Each of these openings 61 constitutes an access hole to the contents of the trough for a piglet. It is thus possible to arrange, for example, about ten openings 61 along a tube 60 with a length of 1.20 m and a diameter of 110 mm.

Each tube 60 is rotationally driven about its longitudinal axis by a bevel gear pair 62. Advantageously, the tubes are coupled in pairs, on either side of a vertical separating wall 63 forming a plane of symmetry between two stalls mounted so as to be opposite each other. The troughs always rotate in the same direction, indicated by each arrow 64a, 64b. The direction of rotation is such that the access holes 61 flow past the piglets from top to bottom. In the drawing of FIG. 3, the two troughs 60a, 60b are therefore driven in opposite directions by one and the same driving shaft.

Each trough 60 moves cyclically between two positions:
- a position for the distribution of the ration of feed and dilution liquid mixture in the trough by means of the tube 66. In this filling position, the openings 61 are substantially pointed towards the separating wall 63;
- a position of supply and of access, for the piglets, to the contents of the troughs, wherein the openings 61 are pointed towards the animals.

Each trough 60 is surmounted by a bar 65 that extends in parallel to the trough. This bar 65 is positioned so as to act as a means to prevent the animals from waiting for food when the trough 60 is no longer in the feeding position.

This arrangement further has the advantages of preventing the animals from having their snouts pinched and injured during the retraction of the troughs. For, since the retraction is done by downward rotation (arrow 64a), the risks of accidents of this type are eliminated.

When the opening in the trough passes from the feeding position to the supply position, the trough gets overturned and empties out its contents. Advantageously, washing ramps 67 are positioned beneath the troughs providing for more intensive washing, by means of injection nozzles 68.

The troughs are advantageously driven in rotation by means of a geared motor (not shown). Microcontactors cooperate with cam plates so as to open the supply circuit of the geared motors during the change-over to each of the two positions, namely the filling position and the feeding position. The rotation of the troughs is started by the sending of pulses to the motor, until the reactivation of the microcontactor and the closing of the supply circuit. The rotation of the motor is then self-sustained until the next cam, corresponding to the passage to the next position of the cycle, is reached. The cleaning ramps 67 positioned below the trough are also controlled, for example, by means of microcontactors cooperating with a separate cam plate.

What is claimed is:

1. A method for the preparation and distribution of feed for animals, the feed being distributed to troughs situated in a plurality of stalls, said method comprising the steps of:
   (a) preparing a feed mixture in a mixer from predetermined volumes of dry feed and diluting liquid;
   (b) distributing the feed mixture by att least one conduit to each trough situated in each of the stalls, and
   (c) diluting in each trough the feed mixture previously distributed in step (b) with a dilution liquid to obtain in each trough a final volume of feed, the dilution liquid being distributed through said at least one conduit to clean said at least one conduit after passage therethrough of the feed mixture.

2. A method according to claim 1, wherein the step (c) of diluting the mixture to prepare the final volume further comprises adjusting the quantity of the dilution liquid according to physiological age of animals to be fed, number of animals in each stall, and period of time for which said animals have been fed in each stall.

3. A computer controlled installation for individually preparing and distributing a physiologically correct portion of feed in discrete, individually prepared batches to animals, the installation comprising:
   a set of stalls for penning animals, with each stall having a trough for accepting feed therein,
   a hopper for storage of dry feed,
   a mixer for mixing dry feed and a diluting liquid, the mixer having two inlets and one outlet, one inlet being configured to receive dry feed stored in the hopper and the other inlet being configured to receive a diluting liquid,
   means for controlling supply of dry feed into the mixer through the dry feed inlet, the dry feed controlling means being controllable by computer to supply a physiologically correct portion of dry feed,
   means for controlling supply of diluting liquid into the mixer through the diluting liquid inlet, the diluting liquid controlling means being controllable by computer to supply a physiologically correct portion of diluting liquid,
   a conduit connected to receive a feed mixture prepared by mixing of dry feed and diluting liquid in the mixer, the conduit being connected to supply a trough in each of the stalls with the feed mixture,
   means for alternately preventing and allowing access to each trough, said access means being controllable by computer.

4. The computer controlled installation of claim 3, wherein the means for alternately preventing and allowing to each trough further comprises cylindrical troughs having openings therein, with each trough being rotatably driven in one direction to move the openings respectively between an animal feeding accessible position and an animal feeding inaccessible position during rotation of each cylindrical trough.

* * * * *